Nov. 26, 1963     J. W. H. BISHOP     3,112,020

RIBBON SPOOL CONSTRUCTION

Filed Sept. 8, 1961

INVENTOR.
JOHN W. H. BISHOP

BY

*Adams, Forward and McLean*

ATTORNEYS

Patented Nov. 26, 1963

3,112,020
RIBBON SPOOL CONSTRUCTION
John W. H. Bishop, Montreal, Quebec, Canada, assignor to Bishop Spools, Inc., New York, N.Y., a corporation of New York
Filed Sept. 8, 1961, Ser. No. 136,777
2 Claims. (Cl. 197—175)

My invention relates to ribbon spools for business machines and the like and in particular provides a spool construction for business machines employing a noiseless core-type spool holder, i.e., a spindle carrying an enlarged hub, provided with a reversing lever designed to move outwardly through an opening in the hub to sense the presence or absence of ribbon wound on a spool mounted in the spindle hub.

Conventionally ribbon spools for business machines having reversing levers of the type moving outwardly through an opening in the hub of the spool are provided with an opening in the bottom flange of the spool registering at its inner end with the opening in the hub of the spool through which the reversing lever operates. This construction is required in order that an empty spool can be removed from the spindle of the business machine without interfering with the reversing lever, since the mounting of the reversing lever is such that while it can ride inwardly under the bottom flange of a spool as it is mounted, the lever unless held in by ribbon on the spool would catch on the bottom flange upon removal of the spool.

Normally, the reversing lever is of a shape extending downwardly from a pivoted connection and outwardly through the aperture in the hub of the spool, while the inner end of the reversing lever extends toward the center of the hub of the spindle and carries a vertical reversing rod co-axially mounted within the spindle. The reversing mechanism is dependent upon the reversing rod falling to a lower position as a result of the removal of ribbon away from the hub of the spool over the reversing lever opening. The reversing action, however, cannot take place if both reversing shafts are in the lowerd position.

This has led to a considerable problem in the operation of business machines employing noiseless core-type ribbon spool holders occasioned by the fact that upon spool installation while the ribbon on a full spool covering the reversing aperture in the bottom flange assures proper inward movement of the reversing lever, frequently the operator of the machine makes one or two turns of ribbon about the hub of the empty spool to secure the ribbon prior to the installation of both the empty and new spools into the machine. At this juncture the reversing lever on the spindle on which the spool with one or two turns of ribbon around it, by reason of the outwardly and upwardly curved construction of the outer end of reversing lever, tends to hook underneath the ribbon on the spool as the reversing lever passes through the aperture on the bottom flange of the spool. When subsequently the ribbon from the full spool is payed off and wound on the previously empty spool the hooked reversing lever is secured in its outwardly extended position between layers of ribbon. As the reversing lever on the other spool is freed by removal of ribbon from the spool and its associated reversing rod drops, reversing action fails to take place since the reversing lever on the initially empty spool is also in reversing position.

I have found that this previously experienced difficulty of the reversing lever locking between layers of ribbon when installing a relatively empty spool on which only a few layers of ribbon are wound can be eliminated by closing the reversing lever aperture in the bottom flange of the spool with a flexible tongue which can flex downwardly to accommodate removal of an empty spool from the spindle. Thus essentially my invention lies in providing a spool having a reversing lever opening in its hub with a flexible tongue in the bottom flange of the spool with the free end of the tongue adjacent the reversing lever opening in the hub of the spool and with its other end affixed and preferably integrally formed with the bottom flange on the spool at a point outwardly of the hub of the spool. Preferably the spool is constructed of plastic material, such as polypropylene, and the tongue is formed by providing a pair of slots in the flange of the spool extending outwardly from the hub adjacent the reversing lever opening in the hub. In this manner the spool can be readily installed on the hub of the spindle with the hub of the spool received on the spindle hub and with the reversing lever opening in the hub of the spool registering with the reversing opening in the hub of the spindle. As the reversing lever engages the under side of the bottom flange of the spool, it therefore engages the under side of the tongue and rides inwardly to permit the spool to seat on the spindle. When the spool is removed from the spindle, if the reversing lever has extended outwardly by reason of removal of ribbon from the spool, the tongue yields downwardly and permits the reversing lever to snap past it.

Fore a more complete understanding of the practical application of my application reference is made to the appended drawings in which.

Figure 1:
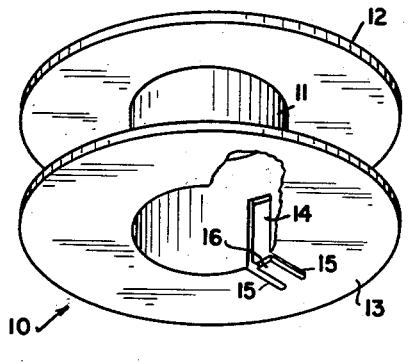
FIGURE 1 is an isometric view of the underside of a business machine ribbon spool constructed in accordance with my invention.

Referring more particularly to FIGURE 1 the business machine ribbon spool of my invention is generally designated by the reference numeral 10 and includes a hollow cylindrical hub 11, the upper end of which carries a top flange 12 and the lower end of which carries a bottom flange 13. In a conventional manner flanges 12 and 13 are annular and perpendicular to the axis of hub 11, and hub 11 is provided with an aperture 14 extending lengthwise of hub 11 approximately half-way up from the bottom. Top flange 12 in a conventional manner has a central opening of a diameter less than the internal diameter of hub 11 while bottom flange 13 has a central opening registering with the interior of hub 11.

Bottom flange 13 immediately adjacent opening 14 is provided with a pair of parallel slots 15, 15 extending outwardly from opposite edges of opening 14 approximately half-way to the outer rim of flange 13 thereby defining a tongue 16. Preferably on the underside of flange 13 tongue 16 has a reduced thickness tapering toward extreme thinness at its inner edge adjacent opening 14 thus, for example, on a typical spool constructed of polypropylene in which bottom flange has a thickness of 0.040 inch the inner edge of tongue 16 has a thickness of 0.020 inch while the outer end of tongue 16 at the outer extremes of slots 15, 15 has a thickness of 0.030 inch, the length of tongue 16 being on the order of 0.20 inch, the width of tongue 16 being 0.10 inch, where the internal hub diameter is 0.75 inch, the flange diameter is 2.05 inches and the hub height between the flanges is 0.50 inch.

Figure 2:
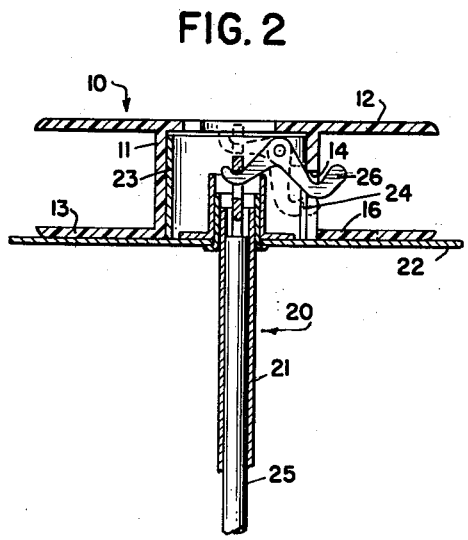
FIGURE 2 is a vertical section of the spool shown in FIGURE 1 and a conventional noiseless core-type business machine spool having a reversing lever illustrating the spool assembled on the spindle absent a ribbon wound on the spool.

Referring more particularly to FIGURE 2 it will be seen that spool 10 is designed to seat on a noiseless core spool holder 20 which in a conventional manner includes a hollow spindle 21 the upper end of which carries a flat plate 22 on which the bottom flange 13 of the spool rests. Above plate 22 spool holder 20 is provided with an enlarged cylindrical hub 23 having a vertical opening 24 which registers with opening 14 of spool 10. In a conventional manner spool 10 and holder 20 are provided with keying means (not shown) to assure such register. Spindle 21 co-axially receives a reversing rod 25 the upper end of which projects into the interior of hub 23. At its upper end adjacent one edge of opening 24 hub 23 pivotally receives the middle of a reversing lever 26 which generally has the shape of the letter W. The inner end of lever 26 hooks through an opening in the upper end of rod 25 while the outer end of lever 26 projects through openings 24 and 14. The axis of pivotal connection of lever 26 to hub 23 is horizontal and perpendicular to a plane including the axis of spool holder 20, and hence it will be observed that any obstruction across opening 14 of spool 10 will prevent lever 26 from extending outwardly through such opening holding rod 25 in an upper position (shown in dashed lines in FIGURE 2) while removal of such an obstruction, as by removing the ribbon from spool 10, permits the weight of rod 25 to force the outer end of lever 26 through opening 14 (as shown in solid lines in FIGURE 2). It will be observed in FIGURE 2 that tongue 16 is positioned by reason of the register of openings 14 and 24 centered immediately beneath the outer projecting end of lever 26.

Figure 3:
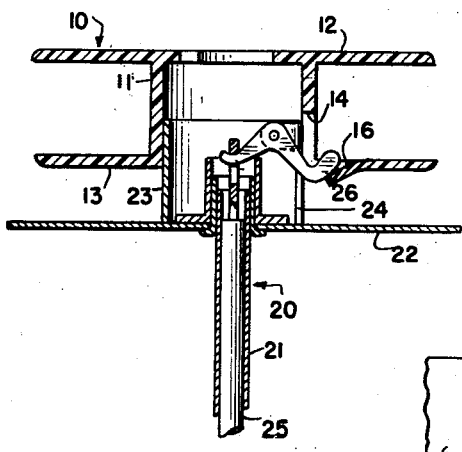
FIGURE 3 is a view similar to that of FIGURE 2 illustrating the removal of the spool from the spindle.

Referring more particularly to FIGURE 3 as spool 10 is raised in empty position off of hub 23 of spool holder 20, the underside of the outer end of lever 26 engages the top of tongue 16 forcing tongue 16 to flex downwardly and allowing lever 26 to clear bottom flange 13 of spool 10. It will be noted that when spool 10 is installed on spool holder 20 the reverse action does not take place since the upper pivotal connection of lever 26 to hub 23 of spool holder 20 allows lever 26 to ride inwardly and around the inner edge of tongue 16, an action similar to that in conventional spools when a ribbon is in place.

Figure 4:
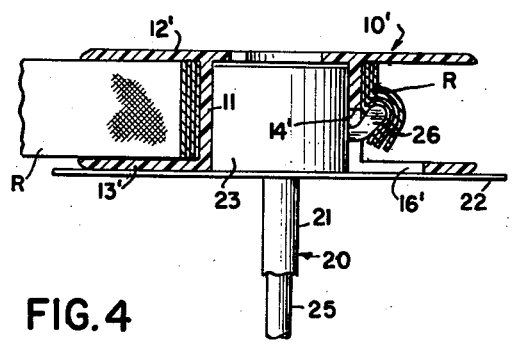
FIGURE 4 is a vertical section of a conventional spool having several layers of ribbon wound on it as it is installed on a spindle, such as shown in FIGURES 2 and 3.

FIGURE 4 illustrates the difficulty encountered when spool 10' (of conventional construction and identical to spool 10 except that an opening 16' is provided at the location of tongue 16) is inserted on a spool holder 20 if several turns of ribbon R have been wound about its hub 11'. In this case since the aperture 16' is provided the outer end of lever 26 hooks under the turns of ribbon R as lever 26 extends through opening 16' leaving reversing rod 25 in its downwardly extending position. Additional turns of ribbon R on spool 10' formed as the associated spool pays out the ribbon thus overlie the outer end of lever 26 and prevent any movement on its part. Subsequently when the associated spool completely pays out ribbon R, since rod 25 is in a down position, the downward movement of the corresponding rod 25 fails to produce proper reversing action.

I claim:

1. In a business machine ribbon spool for a noiseless core-type spool holder and having a hub, an annular flange at the lower end of said hub and a reversing lever aperture in said hub extending from said end thereof; the improvement which includes means in said flange defining a flexible tongue having its free end adjacent said aperture and its other end secured to said flange outwardly of said aperture.

2. The improvement according to claim 1 in which said means is a pair of slots in said flange extending outwardly from opposite edges of said aperture.

References Cited in the file of this patent

UNITED STATES PATENTS

| | | |
|---|---|---|
| 1,474,111 | Gabrielson | Nov. 13, 1923 |
| 2,930,469 | Roggenstein | Mar. 29, 1960 |
| 3,002,707 | Noble | Oct. 3, 1961 |